United States Patent [19]
Firmin

[11] Patent Number: 5,894,692
[45] Date of Patent: Apr. 20, 1999

[54] FISHING LURE AND METHOD

[75] Inventor: Herman P. Firmin, Baton Rouge, La.

[73] Assignee: Knight Manufacturing Co., Inc., Tyler, Tex.

[21] Appl. No.: 08/899,671

[22] Filed: Jul. 24, 1997

[51] Int. Cl.⁶ .................................................. A01K 85/00
[52] U.S. Cl. ...................... 43/42.02; 43/42.24; 43/42.28; 43/4.5
[58] Field of Search ................. 43/42.24, 42.26, 43/42.27, 42.28, 42.02, 4.5

[56] References Cited

U.S. PATENT DOCUMENTS

| | | | |
|---|---|---|---|
| D. 222,058 | 9/1971 | Meadors | 43/42.26 |
| 1,417,574 | 5/1922 | Schmid | 43/42.02 |
| 1,803,777 | 5/1931 | Speich | 43/42.28 |
| 1,849,434 | 3/1932 | Page | 43/42.02 |
| 2,047,768 | 7/1936 | Christiansen | 43/42.02 |
| 2,312,585 | 3/1943 | Piro | 43/42.02 |
| 2,883,785 | 4/1959 | Croft | 43/42.28 |
| 2,912,783 | 11/1959 | Marks | 43/42.28 |
| 3,054,209 | 9/1962 | Wiley | 43/42.02 |
| 3,100,360 | 8/1963 | Creme | 43/42.02 |
| 3,153,298 | 10/1964 | Lemon | 43/42.02 |
| 3,959,912 | 6/1976 | Lee | 43/42.02 |
| 4,069,610 | 1/1978 | Firmin | 43/42.24 |
| 4,208,822 | 6/1980 | Bryant | 43/42.02 |
| 4,581,841 | 4/1986 | Gish | 43/42.02 |
| 4,890,412 | 1/1990 | Tsao | 43/42.24 |
| 5,640,798 | 6/1997 | Garst | 43/42.26 |

FOREIGN PATENT DOCUMENTS 103214  1/1964  Norway ................. 43/42.27

Primary Examiner—Kurt Rowan
Attorney, Agent, or Firm—Charles M. Kaplan

[57] ABSTRACT

Soft bodied flexible resilient supple plastic fishing lures have a multitude of closely spaced interconnected thin longitudinal fins that automatically produce fishing attracting sounds, motions, and light reflections when the lures are moved through the water. The lure bodies store energy when the lures are retrieved and then release the stored energy so as to produce game fish attracting motions when the retrieving ceases.

17 Claims, 4 Drawing Sheets

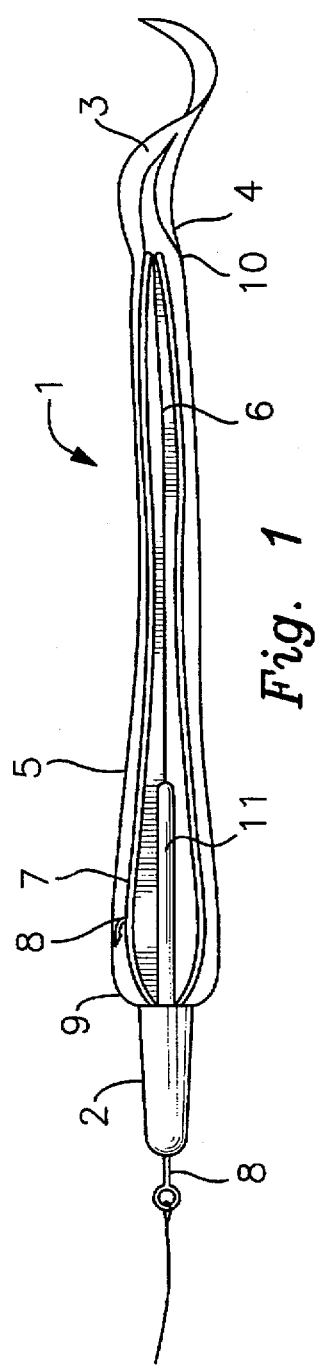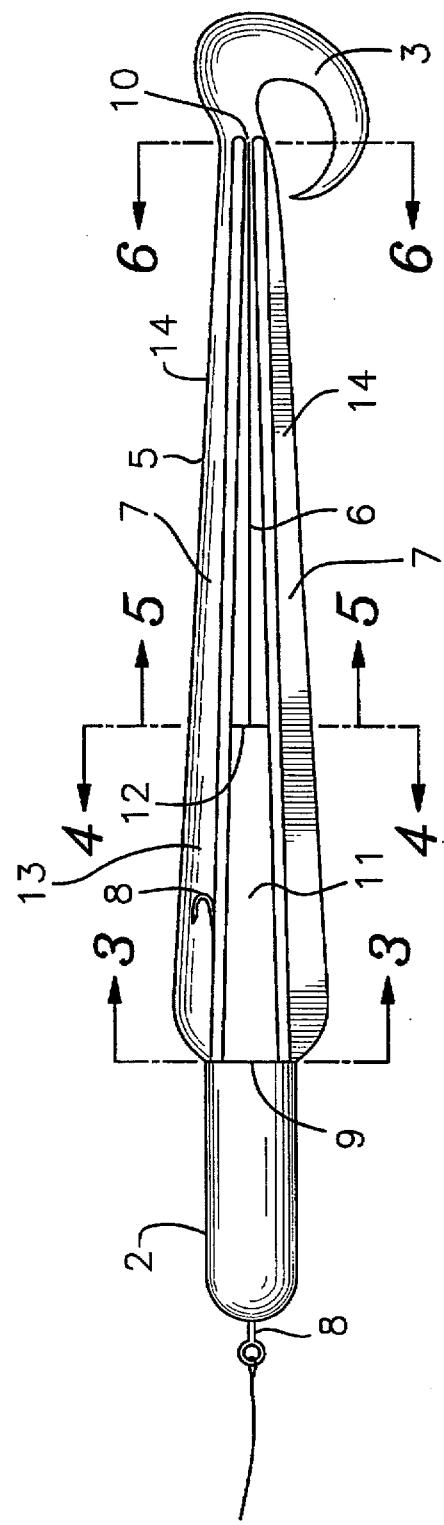

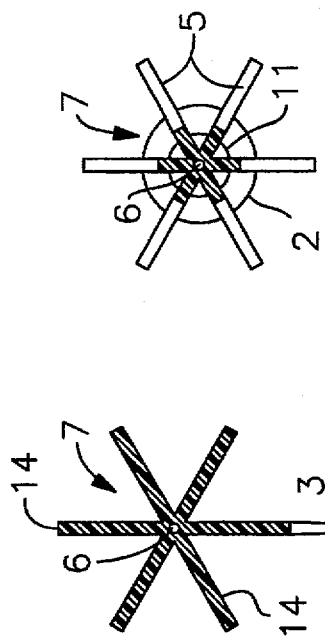
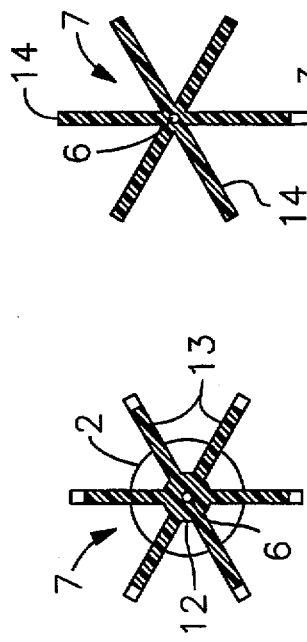
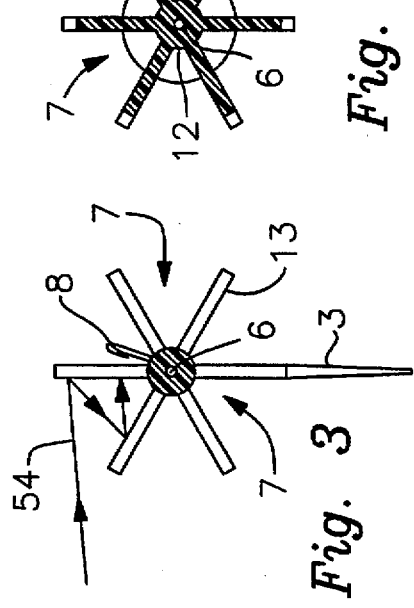
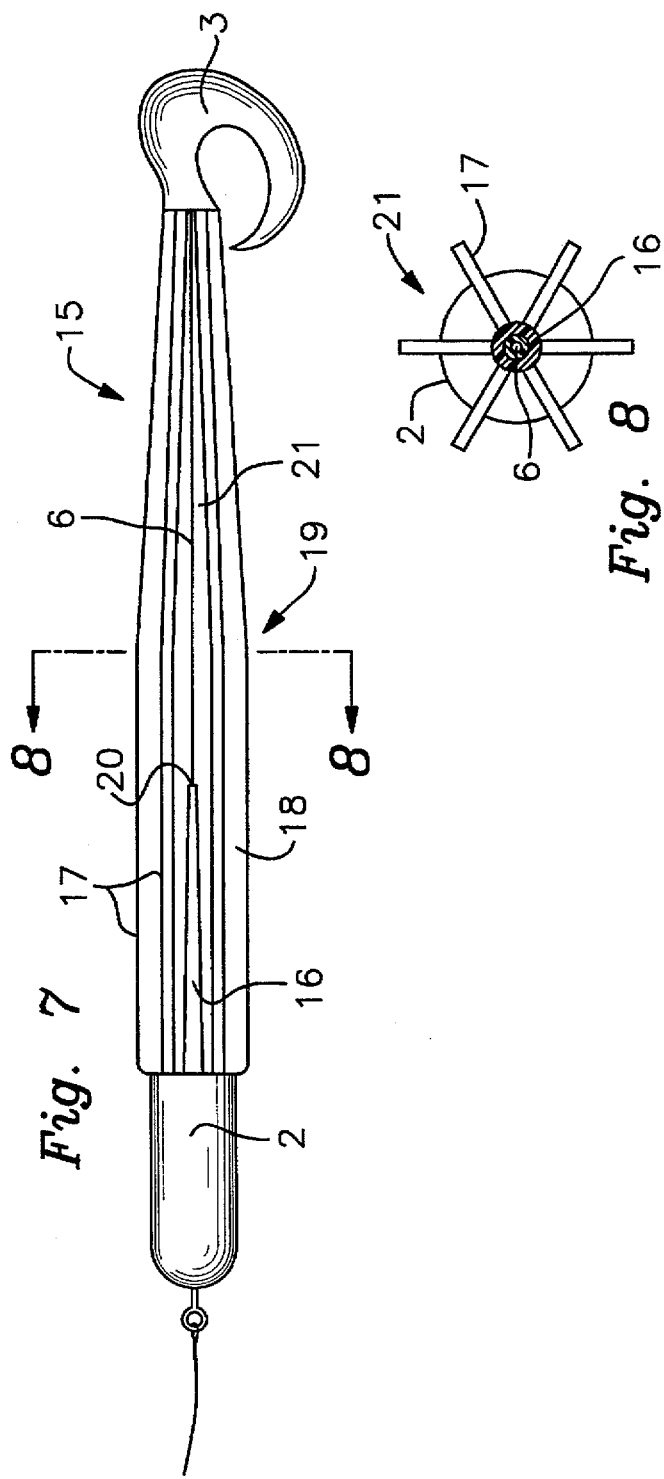

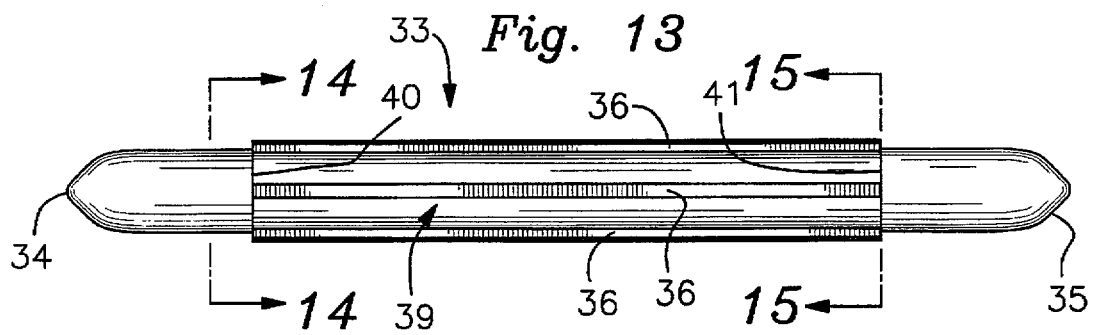
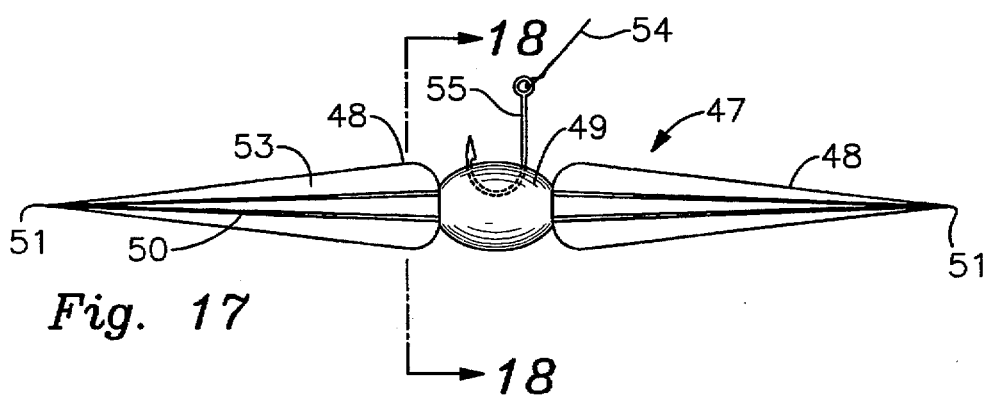
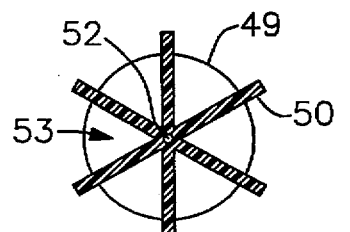

5,894,692

1

FISHING LURE AND METHOD

BACKGROUND OF THE INVENTION

This invention relates to fishing tackle, and more particularly to artificial fishing lures. A fishing lure having a soft supple body feels more lifelike to game fish than a fishing lure with a hard body. This causes a game fish that strikes the soft bodied lure to hold the soft lure in its mouth longer than the fish would hold a hard lure. When the fish holds the soft lure longer, it gives the fisherman more time to feel the strike and set the hook in the fish's mouth. But fishing lures with soft bodies usually do not automatically come with the type of action that attracts game fish and then causes them to bite. The fisherman has to manipulate the rod and reel with an action that causes soft lures to move in a way that induces fish to strike. Most fishermen lack the skill and patience required to move the rod and reel in ways that cause soft bodied lures to have an action that consistently catches fish. Also, prior art soft bodied lures ordinarily feel dead to a fish that has taken a lure into its mouth because the lure does not struggle to escape like a live creature would. The game fish will not bite down on the dead feeling lure as hard or as long as it would on a lure that feels like it is alive and struggling to escape.

OBJECTIVES OF THE INVENTION

Accordingly, it is an object of this invention to provide improved fishing tackle, and lures and methods of using same.

Another object is to provide soft bodied fishing lures that have built-in or automatic fish attracting actions.

Another object is to provide fishing lures with a multitude of longitudinal fins that are spaced close enough to each other at acute angles that cause multiple refractions and reflections of light between the fins that attract fish.

A further objective is to provide a soft multi fined fishing lure that will feel like it is wiggling or squirming to escape when the lure is squeezed in the mouth of a game fish.

Another object is to provide a method for causing fish attracting movements of fishing lures by expanding and compressing water flowing through channels in the body of the lures.

Another object is to provide soft bodied fishing lures with multiple fins that greatly increase the surface area of the lures when compare with conventional soft bodied lures.

Another object is to provide fishing lures with enough fins to significantly increase the underwater sounds that attract game fish.

A further object is to provide fishing methods in which lures store energy of their movement so that the lures will continue to have fishing attracting motions even after the fisherman has stopped reeling in the lures.

Another object is to provide a soft finned fishing lure that can be rigged weedless even though the hook point is not buried in the solid plastic mass of the lure body.

An additional object is to provide methods of using soft bodied lures that help unskilled fishermen to catch fish more easily.

A further object is to provide soft, natural feeling and looking plastic fishing lures that automatically shimmer, rotate, undulate, squirm or twist so that the lures can be fished effectively by unskilled fishermen, such lures also being durable, relatively inexpensive, easy to rig and change, and such lures not possessing defects found in similar prior art fishing lures.

2

Other objects and advantages of the fishing lures and methods incorporating this invention will be found in the specification and claims and the scope of the invention will be set forth in the claims.

DESCRIPTION OF THE DRAWING

FIG. 1 is a perspective view of an embodiment of the invention.

FIG. 2 is an enlarged side view of the embodiment shown in FIG. 1.

FIG. 3 is an enlarged cross sectional view taken along the line 3—3 in FIG. 2.

FIG. 4 is an enlarged cross sectional view taken along the line 4—4 in FIG. 2.

FIG. 5 is an enlarged cross sectional view taken along the line 5—5 in FIG. 2.

FIG. 6 is an enlarged cross sectional view taken along the line 6—6 in FIG. 2.

FIG. 7 is a side view of an another embodiment of the invention.

FIG. 8 is an enlarged cross sectional view taken along the line 8—8 in FIG. 7.

FIG. 13 is a side view of an another embodiment of the invention.

FIG. 14 is an enlarged cross sectional view taken along the line 14—14 in FIG. 13.

FIG. 15 is an enlarged cross sectional view taken along the line 15—15 in FIG. 13.

FIG. 16 is an enlarged cross sectional view of an another embodiment of the invention, that corresponds to the section taken along the line 15—15 in FIG. 13.

FIG. 17 is a side view of an another embodiment of the invention.

FIG. 18 is an enlarged cross sectional view taken along the line 18—18 in FIG. 17.

DESCRIPTION OF THE INVENTION

Figure 9:
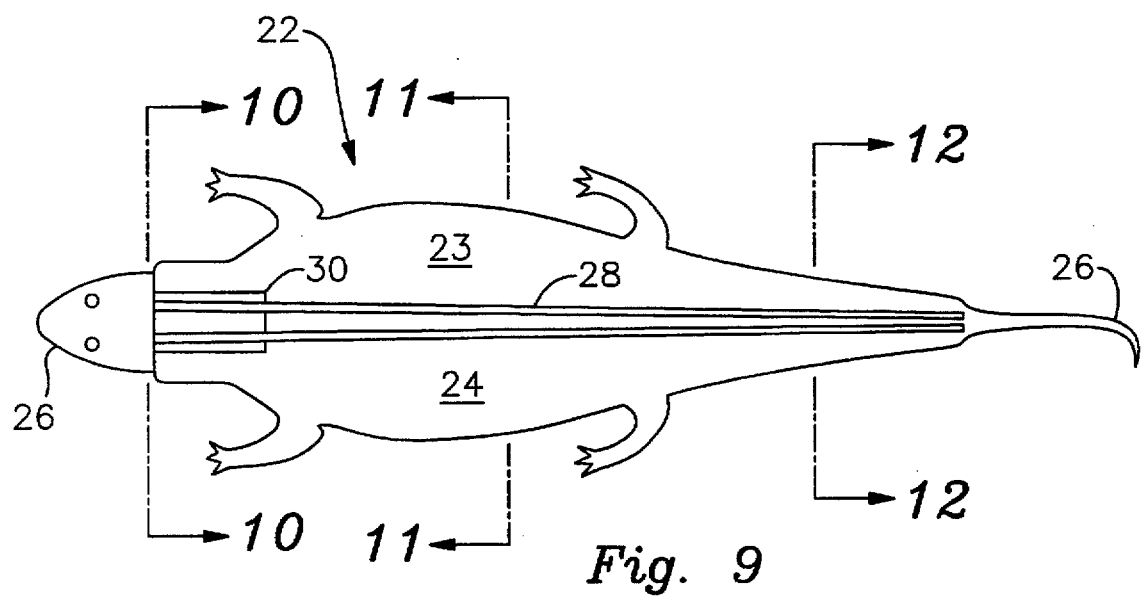
FIG. 9 is a top plan view of an another embodiment of the invention.
Figure 10:
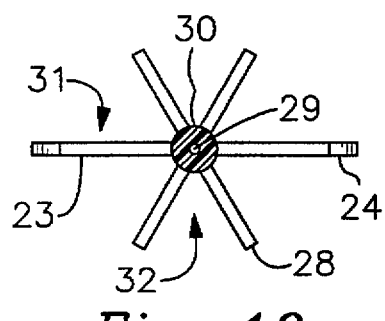
FIG. 10 is an enlarged cross sectional view taken along the line 10—10 in FIG. 9.
Figure 11:
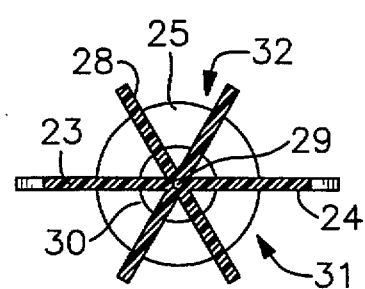
FIG. 11 is an enlarged cross sectional view taken along the line 11—11 in FIG. 9.

The drawing shows fishing tackle in accord with this invention. In the embodiment of FIGS. 1–6 a supple soft bodied fishing lure 1 may have a streamlined solid relatively heavy and less flexible head or front end portion 2 and a thin light relatively more flexible curved flutter tail 3 at the rear end 4 of the lure. The front and rear ends of the lure are integrally connected by six identical highly flexible longitudinally extending thin fins 5 that are uniformly spaced at an acute angle of sixty degree angles around the longitudinal central axis 6 of the lure. The fins 5 taper or slant uniformly from the immediately behind the front end portion 2 toward the tail 3 so as to define six identical longitudinally tapered water flow channels 7. The radial length of the fins 5 is longer adjacent the head portion 2 than at the tail 3 and the cross sectional area of the channels 7 is greater at their front ends 9 than at their rear ends 10. The radial length of the fins may be long enough to extend past the point of a hook 8 so that the rig is weedless.

An integral central core 11 extends longitudinally into the channels 7 from immediately behind the head portion 2 toward the flutter tail 3. The central core may be a right circular cylinder in shape and should be centered on the axis 6. The core 11 has a terminal end 12 located in the channels 7 less than half way to the tail 3. The front portion 13 if each fin is integral with the core 11. The remaining portion 14 of each fin 5, which is more than half of their length, is directly integrally connected only to the other fins, and the line of intersection of all of the portions 14 is the central axis 6.

The flexibility of the lure 1 increases in steps from its front end to its rear end. Solid head portion 2 has the least flexibility. The flexibility of the lure increases abruptly at the back end of the head portion 2 where the fins 5 and central core 11 begin, as shown in FIG. 3. The lure flexibility increases abruptly again immediately to the rear of the terminal end 12 of the central core 11, and the last stepped increase in flexibility occurs where the fins 5 terminate and the flutter tail 3 begins.

The flow of water through the channels 7 is not uniform. The channels are largest in cross sectional area at their entrance ends immediately behind the head portion 2. However the head portion 2 partially blocks the channels 7, and the central core 11 separates the fins 5, thus taking up some of the area between the fins, as shown in FIG. 4. The area of the channels decreases uniformly in the direction of the tail 3 because of the tapering of the fins 5. However, immediately to the rear of the terminal end 12 of the central core, the area of the channels 7 increases because the core 11 is not there to occupy the space between the fins, as shown in FIG. 5. Thereafter, the area the channels decreases uniformly until the channels end at the beginning of the tail 3.

FIGS. 7 and 8 show another embodiment of the invention that is identical to the embodiment of FIGS. 1–6 except in the following details. The lure 15 has a central core 16 shaped like a section of a right circular cone instead of being cylindrical, and the fins 17 have forward portions 18 that do not taper. The fins begin to taper toward the tail portion 3 at a location 19 (e.g. at the section line 8—8) between the small terminal end 20 of the core 16 and the flutter tail 3. In this embodiment the same abrupt increases in lure flexibility occur in the same locations descried above with reference to the FIGS. 1–6 embodiment. Also, the water flow through the six identical channels 21 is even more non-uniform because the added differences in the spacing of the tapered central core 16 and the non tapered forward portions 18 of the fins change the ways in which the channels cross sections vary from each other.

Figure 12:
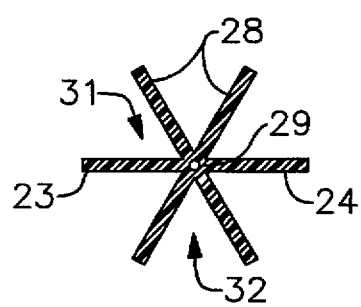
FIG. 12 is an enlarged cross sectional view taken along the line 12—12 in FIG. 9.

FIGS. 9–12 show another embodiment in which a lure 22 has two essentially identical enlarged fins 23 and 24 that are aligned in a horizontal plane. The fins 23 and 24 and other sections of the lure 22 may be enlarged when they are located in the plane of the parting line of the mold in which the lure is cast. The fins 23 and 24, the head 25 and the tail 26 are shaped to resemble an aquatic creature preyed upon by game fish. The remaining four fins 28 are identical and evenly spaced around the longitudinal central axis 29 as described with reference to the above embodiments. The fins 28 may taper uniformly from the front to the back of the lure as described with reference to FIGS. 1–6, and the central core 30 may be either cylindrical or conical. Abrupt or stepped changes in the flexibility of this embodiment also occur, as is evident from the cross sections shown in FIGS. 10–12. It is also evident from these cross sections that the water flow through the differently shaped channels 31 and 32 is not uniform. At some location along the central axis 29, as shown in FIG. 12, the fins 23, 24 and 28 become identical and the continue to be identical as they taper rearwardly for the remainder of their longitudinal extent. To the rear of the central core 30, the fins are directly integrally connected only to each other at the central axis 29.

FIGS. 13–15 show another embodiment of a lure 33 having identical solid relatively less flexible front and rear end portions 34 and 35. Six identical relatively more flexible non-tapering fins 36 are uniformly spaced at sixty degree angles around the longitudinal central axis 37 of the lure. The fins 36 are directly integrally connected only to each other for their entire length. The identical longitudinal water flow channels 39 formed by the fins 36 are almost completely blocked at both ends 40 and 41 by the end portions 34 and 35. Abrupt changes in the flexibility of the lure 33 occur where the fins 36 connect to the front and rear portions 34 and 35.

FIG. 16 shows another lure 42 that is identical to the embodiment of FIGS. 13–15 except that this embodiment has a central core 43 that extends from the front end portion 44 toward the rear of the lure. The section shown could be taken along the line 15—15 in FIG. 13. The core 43 may be either conical or tapered. The core 43 must not extend past the mid point of the lure so that the fins 45 will be directly integrally connected only to each other at the longitudinal central axis 46 for more than half of their length. The central core 43 is relatively more flexible than the front and rear end portions of the lure, but is less flexible than the fins 45.

FIG. 17 shows another fishing lure 47 having a a pair of identical finned sections 48 that extend in opposite directions from, and are integral with, a circular solid center body portion 49. Each section 48 has six identical fins 50 that are essentially identical to the fins of the embodiment of FIGS. 1–6, except in the following respects. The lure 47 does not have a flutter tail, so the fins 50 come to a point at their terminal ends 51; also the lure 47 does not have a central core so the fins 50 are direct integrally connected only to each other at the longitudinal central axis 53 for their entire length. Thus the six identical longitudinally extending thin fins 50 are uniformly spaced at sixty degree angles around the axis 52. The fins taper or slant uniformly from the immediately ahead of the center body portion 49 toward the lure terminal ends 51 so as to define twelve identical longitudinally tapered water flow channels 53. The radial length of the fins 50 is longer adjacent the center portion 49 than at the lure terminal ends 51, and the cross sectional area of the channels 53 is less at their terminal ends than at the center of the lure.

The lure 47 should be connected to a fishing line 54 by inserting a hook 55 into the center body portion 49. When the lure 47 is retrieved, the finned sections 48 will bend in the direction opposite to the direction that the lure is being pulled by the line 54. This bending stores energy in the fins 50 and center portion 49. When the fisherman stops or slows the retrieve, the stored energy is released by movement of the fins 50 to or toward their original positions as shown in FIG. 17, and the finned sections 48 appear to flap like bird wings.

All parts of the fishing lures in accord with this invention should be molded from synthetic plastic materials that are very soft and supple so that the lures will feel lifelike to game fish. These plastics should be sufficiently flexible, resilient and elastic that the lure heads, tails, fins and central cores will store energy when they are moved, flexed or twisted so the lure components or portions will have a memory of, and will return to, their original position or location with respect to the longitudinal central axis of the lure. The specific gravity and density of the plastic should be low enough that the lure will float in water. Many conventional plastisol plastic formulations used to mold soft bodied fishing lures, such as polyvinyl chloride plasticized with esters such as phathalate, can be used to practice this invention. Plastomeric Corporation is a commercial source for such plastic molding formulations.

The lures disclosed herein may be fished in any known manner by impaling any of the lures on a hook that pierces the head portions (e.g. 2, 34 or 49) and/or the central cores (e.g. 11, 16, 30 or 43). Because of the radial length of the fins, the lures may be rigged weedless even though the hook point is not buried in any solid mass of plastic forming part of the lure body. The close spacing and undulating movements of the fins (e.g. 5, 15, 24, 25, 28, 36, 45 and 51) produces multiple reflections and refractions of light between the fins that attract game fish, as indicated by the line 54 in FIG.3. Also, the large relatively thin and supple surface area of the many interconnected fins produces under water sounds that attract game fish. When these lures are retrieved or pulled through the water, the abrupt or stepped changes in the flexibility of the lures and the non-uniform flow and compression of water through the decreasing and/or increasing shapes of the channel cross sections, as described previously, causes the lures to have a variety of built-in game fish attracting undulations and other motions.

Under some conditions, these lures will rotate or twist around their central axis while the lures are being retrieved or pulled through the water in their longitudinal direction for only a short distance (e.g. two to four feet). The plastic from which the lures are made can, for example, store in the lure central core, the energy used to cause such changes in lure shape; the result is that when the fisherman ceases retrieving or moving the lure for only a short time (e.g. five seconds), the memory of the plastic central core will cause the stored energy to be released by moving the lure shape back toward or to the original configuration of the lure. These lure motions resulting from stored energy occur automatically so they give unskilled fisherman a method of using soft bodied lures effectively without having to master the tricky hand and rod movements required when fishing conventional soft bodied lures.

When a game fish strikes and takes a lure in accord with this invention into its mouth, the fish will bite down on the lure so that some of the closely spaced fins will be squeezed out of their normal orientation. This squeezing of the fins will store energy in the fins and central core or center body portion; the memory of the plastic will cause the displaced fins to move back to or toward their normal orientation when the fish releases or lessens the pressure of its jaws on the lure in its mouth. The movement of the displaced fins or other lure body parts in the fish's mouth will make the lure feel like it is alive and struggling to escape; this will cause the fish instinctively to again bite down on the lure. When the fish bites down again, the fisherman will have additional time to feel the strike and set the hook in the fish's mouth.

While the present invention has been described with reference to particular embodiments, it is not intended to illustrate or describe all of the equivalent forms or ramifications thereof. Also, the words used are words of description rather than limitation, and various changes may be made without departing from the spirit or scope of the invention disclosed herein. It is intended that the appended claim cover all such changes as fall within the true spirit and scope of the invention.

I claim:
1. An artificial fishing lure, comprising:
   A. a soft body having a longitudinal central axis, said soft body being made from a flexible resilient plastic material and having an integral solid relatively heavy and less flexible head portion at its front end, and said soft body having an integral thin relatively light and more flexible flutter tail at its rear end;
   B. a plurality of longitudinal fins extending between said head portion and said flutter tail, said fins projecting radially outwardly from said longitudinal central axis and being spaced essentially evenly around said longitudinal central axis so as to define a plurality of longitudinal water flow channels that extend from immediately behind said head portion to immnediately ahead of said flutter tail;
   C. a central core of said flexible resilient material extending longitudinally from immediately behind said head portion into said water flow channels toward said flutter tail, but said central core having a terminal end in said channels ahead of said flutter tail, said central core being centered on said longitudinal central axis; and
   D. the radial length of at least some of said fins being longer adjacent said head portion than adjacent said flutter tail so as to cause the area of at least some of said channels to be smaller adjacent said flutter tail than the area of such channels adjacent said head portion, there being a location along said longitudinal central axis behind said terminal end of said central core between said head portion and said flutter tail where the area of at least some of said channels is greater than said area of such channels adjacent said central core, whereby the flow of water through said channels from said head portion to said flutter tail is non-uniform.

2. The artificial fishing lure defined in claim 1, wherein said fins are identical and taper essentially uniformly from said head portion to said flutter tail.

3. The artificial fishing lure defined in claim 1, wherein said fins taper essentially uniformly toward said flutter tail from a location beginning to the rear of said terminal end of said central core.

4. The artificial fishing lure defined in claim 1, wherein said fins are directly integrally connected only to each other between said terminal end of said central core and said flutter tail.

5. The artificial fishing lure defined in claim 1, wherein said fins directly integrally connected only to each other for more than half of their length.

6. The artificial fishing lure defined in claim 1, further comprising said body having six fins spaced at an angle of sixty degrees around said longitudinal central axis, two of said fins being aligned in an essentially horizontal plane, the two horizontally aligned fins having portions that are substantially greater in radial extent that the remaining four fins, and said two horizontally aligned fins being shaped to resemble an aquatic creature.

7. The artificial fishing lure defined in claim 1, further comprising: said central core being relatively more flexible than said head portion but relatively less flexible than said fins and said flutter tail, and a front portion of said fins being integral with said central core, whereby the flexibility of said lure body increases in steps from its front end to its rear end.

8. The artificial fishing lure defined in claim 1, further comprising: six essentially identical fins spaced around said longitudinal central axis at angles of sixty degrees so as to define six essentially identical water flow channels.

9. An artificial fishing lure, comprising:

A. a soft body having a longitudinal central axis, said soft body being made from a flexible resilient plastic material and having an integral solid relatively heavy less flexible head portion at its front end, and said soft body having an integral thin, relatively light and more flexible flutter tail at its rear end;

B. a plurality of thin longitudinal fins extending between said head portion and said flutter tail, said fins projecting radially outwardly from said longitudinal central axis and being spaced essentially evenly around said longitudinal central axis so as to define a plurality of longitudinal water flow channels that extend from immediately behind said head portion to immediately ahead of said flutter tail; and C. an integral central core of said flexible resilient material extending longitudinally into said water flow channels from immediately behind said head portion toward said flutter tail, said central core being circular in cross section and terminating in said channels ahead of said flutter tail, said central core being relatively more flexible than said head portion but relatively less flexible than said fins and said flutter tail, and a front portion of said fins being integral with said central core, whereby the flexibility of said lure body increases in steps from its front end to its rear end.

10. The artificial fishing lure defined in claim 9, wherein said central core is conical with its largest end adjacent said head.

11. The artificial fishing lure defined in claim 9, wherein said central core is cylindrical.

12. The artificial fishing lure defined in claim 9, wherein the radial length of at least some of said fins is longer adjacent said head portion than adjacent said flutter tail so as to cause the area of at least some of said channels to be smaller adjacent said flutter tail than the area of such channels adjacent said head portion, there being a location along said longitudinal central axis behind said terminal end of said central core between said head portion and said flutter tail where the area of at least some of said channels is greater than said area of such channels adjacent said central core, whereby the flow of water through said channels from said head portion to said flutter tail is non-uniform.

13. The artificial fishing lure defined in claim 9, wherein said fins are directly integrally connected only to each other at the same acute angle between said terminal end of said central core and said flutter tail.

14. An artificial fishing lure, comprising:

A. a soft body having a longitudinal central axis, said soft body being made from a flexible resilient plastic material and having an integral solid head portion at its front end and an integral tail portion at its rear end that is essentially identical to said head portion;

B. at least six longitudinal fins extending from said head portion to said tail portion, said fins being directly integrally connected only to each other for most of their length, said fins projecting radially outwardly from said longitudinal central axis and being spaced essentially evenly around said longitudinal central axis so as to define at least six essentially identical longitudinal water flow channels that extend from said head portion to said tail portion, said water flow channels having an entrance end immediately behind said head portion and a discharge end immediately ahead of said tail portion;

C. said head portion being centered on and extending radially outwardly around said longitudinal central axis so as to substantially block said entrance end of said water flow channels, said tail portion substantially closing said discharge end of said water flow channels, and said water flow channels being uninterrupted between said entrance end and said discharge end; and D. a central core of said flexible resilient material extending longitudinally from immediately behind said head portion into said water flow channels toward said tail portion, said central core being circular in cross section and relatively more flexible than said head portion but relatively less flexible than said fins, and said fins being integral with said central core.

15. An artificial fishing lure, comprising:

A. a soft body having a longitudinal central axis, said soft body being made from a flexible resilient plastic material and having an integral solid relatively heavy and less flexible body portion at its center, and a pair of identical finned sections extending in opposite directions from the center body portion;

B. each finned section comprising a plurality of identical longitudinally extending fins that project radially outwardly from said longitudinal central axis and are spaced essentially evenly around said longitudinal central axis so as to define a plurality of identical longitudinal water flow channels that extend from immediately behind said center portion in opposite directions to opposite terminal ends of said lure, said fins being directly integrally connected only to each other for their entire length; and C. the radial length of said fins being longer adjacent said center portion than at said terminal ends so as to cause the area of said channels to be smaller at said terminal ends than the area of such channels adjacent said center portion.

16. A method for causing an artificial fishing lure that has a longitudinal central axis to have fish attracting motions when said lure is not being retrieved, comprising the steps of:

A. molding a body having a head portion and a tail portion for said lure from a resilient flexible soft plastic material that stores energy when said lure is moved with respect to said longitudinal central axis;

B. attaching to said body in locations spaced around said longitudinal central axis a plurality of longitudinally extending fins that define water flow channels and can cause a portion of said body to twist with respect to said longitudinal central axis, extending said channels from said head portion to said tail portion, and increasing and then decreasing the area of said channels between said head portion and said tail portion so that the water flow through said channels is non-uniform;

C. moving said lure through water along said longitudinal central axis for sufficient distance to cause said portion of said body to twist in one direction with respect to said longitudinal central axis and thereby to store energy in said portion of said body; and D. ceasing movement of said lure through water along said longitudinal central axis for sufficient time to cause said portion of said body to release the stored energy by twisting itself in a different direction with respect to said longitudinal central axis.

17. A method for causing an artificial fishing lure that has a longitudinal central axis to have fish attracting motions when said lure is not being retrieved, comprising the steps of:

A. molding a body having a head portion and a tail portion for said lure from a resilient flexible soft plastic material that stores energy when said lure is moved with respect to said longitudinal central axis;

B. attaching to said body in locations spaced around said longitudinal central axis a plurality of longitudinally extending fins that define water flow channels and can cause a portion of said body to twist with respect to said longitudinal central axis, extending said channels from said head portion to said tail portion, directly connecting said fins integrally only to each other at said longitudinal central axis for most of their length, and directly connecting said fins integrally to a central core of said plastic material for the remainder of their length;

C. moving said lure through water along said longitudinal central axis for sufficient distance to cause said portion of said body to twist in one direction with respect to said longitudinal central axis and thereby to store energy in said central core; and D. ceasing movement of said lure through water along said longitudinal central axis for sufficient time to cause said central core to release the stored energy by twisting itself with in a different direction with respect to said longitudinal central axis.

* * * * *